US009643603B2

(12) United States Patent (10) Patent No.: US 9,643,603 B2
Kawahara et al. (45) Date of Patent: May 9, 2017

(54) TRAVEL CONTROLLER, SERVER, AND IN-VEHICLE DEVICE

(71) Applicant: DENSO CORPORATION, Kariya, Aichi-pref. (JP)

(72) Inventors: Nobuaki Kawahara, Kariya (JP); Makiko Tauchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/032,513

(22) PCT Filed: Oct. 16, 2014

(86) PCT No.: PCT/JP2014/005268
§ 371 (c)(1),
(2) Date: Apr. 27, 2016

(87) PCT Pub. No.: WO2015/064041
PCT Pub. Date: May 7, 2015

(65) Prior Publication Data
US 2016/0272199 A1 Sep. 22, 2016

(30) Foreign Application Priority Data

Oct. 30, 2013 (JP) .................................. 2013-225526
Aug. 25, 2014 (JP) .................................. 2014-170669

(51) Int. Cl.
*B60W 30/08* (2012.01)
*B60T 7/12* (2006.01)
(Continued)

(52) U.S. Cl.
CPC ............. *B60W 30/08* (2013.01); *B60K 35/00* (2013.01); *B60R 21/00* (2013.01); *B60T 7/12* (2013.01);
(Continued)

(58) Field of Classification Search
CPC ........ B60W 30/08; B60W 30/14; B60W 30/16; B60W 2550/14; B60W 2550/12;
(Continued)

(56) References Cited

U.S. PATENT DOCUMENTS 7,903,021 B2 * 3/2011 Aso ....................... B60W 40/02
342/27
2010/0324753 A1 * 12/2010 Okumatsu ............ B62K 11/007
701/2

FOREIGN PATENT DOCUMENTS

JP 2004258889 A 9/2004
JP 2007287168 A 11/2007
(Continued)

OTHER PUBLICATIONS

International Serch Report and Written Opinion (in Japanese with English Translation) for PCT/JP2014/005268, mailed Jan. 6, 2015.

*Primary Examiner* — Rodney Butler
(74) *Attorney, Agent, or Firm* — Harness, Dickey & Pierce, P.L.C.

(57) ABSTRACT

A travel control device includes: a vehicle detection device configured to detect a position of a peripheral vehicle that travels in a periphery of a host vehicle in a lane, in which the host vehicle travels, or a lane adjacent to and heading in a same direction of the host vehicle; a generation device configured to assign a potential field to a predetermined region, which is adjacent to the position of the peripheral vehicle, the potential field indicating a degree of psychological pressure received by a driver of the host vehicle, and configured to generate a potential distribution that represents a distribution of the potential field of the peripheral vehicle on a road; and a control device configured to control a travel condition of the host vehicle that the host vehicle travels in the potential field relatively low in the potential distribution.

11 Claims, 12 Drawing Sheets

(51) Int. Cl.
*G08G 1/04* (2006.01)
*G08G 1/09* (2006.01)
*B60W 30/16* (2012.01)
*B60R 21/00* (2006.01)
*G08G 1/16* (2006.01)
*G08G 1/01* (2006.01)
*G08G 1/0967* (2006.01)
*B60T 8/172* (2006.01)
*B60W 30/14* (2006.01)
*B60K 35/00* (2006.01)
*G05D 1/00* (2006.01)
*H04L 29/08* (2006.01)

(52) U.S. Cl.
CPC .............. *B60T 8/172* (2013.01); *B60W 30/14* (2013.01); *B60W 30/16* (2013.01); *G05D 1/0088* (2013.01); *G08G 1/0125* (2013.01); *G08G 1/04* (2013.01); *G08G 1/096725* (2013.01); *G08G 1/096758* (2013.01); *G08G 1/096775* (2013.01); *G08G 1/16* (2013.01); *G08G 1/164* (2013.01); *H04L 67/12* (2013.01); *B60K 2350/352* (2013.01); *B60T 2201/08* (2013.01); *B60T 2210/32* (2013.01); *B60T 2210/34* (2013.01); *B60W 2540/22* (2013.01); *B60W 2540/30* (2013.01); *B60W 2550/12* (2013.01); *B60W 2550/14* (2013.01); *B60W 2550/20* (2013.01)

(58) Field of Classification Search
CPC ......... B60W 2540/30; B60W 2550/20; B60W 2540/22; H04L 67/12; G05D 1/0088; G08G 1/0125; G08G 1/164; G08G 1/16; G08G 1/096775; G08G 1/096725; G08G 1/04; G08G 1/096758; B60K 35/00; B60K 2350/352; B60T 8/172; B60T 7/12; B60T 2210/32; B60T 2210/34; B60T 2201/08; B60R 21/00
See application file for complete search history.

(56) References Cited

FOREIGN PATENT DOCUMENTS

| | | |
|---|---|---|
| JP | 2008282275 A | 11/2008 |
| JP | 2010175314 A | 8/2010 |
| JP | 2012104031 A | 5/2012 |

\* cited by examiner

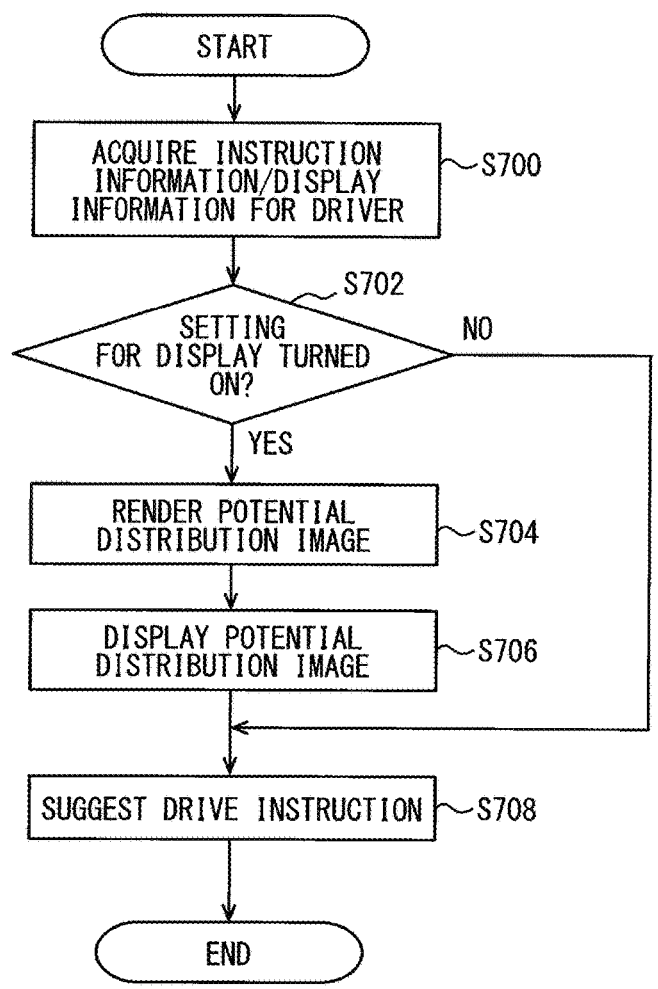

TRAVEL CONTROLLER, SERVER, AND IN-VEHICLE DEVICE

CROSS REFERENCE TO RELATED APPLICATIONS

This application is a U.S. National Phase Application under 35 U.S.C. 371 of International Application No. PCT/JP2014/005268, filed on Oct. 16, 2014, and published in Japanese as WO 2015/064041 A1 on May 7, 2015. This application is based on and claims the benefit of priority from Japanese Patent Applications No. 2013-225526 filed on Oct. 30, 2013, and No. 2014-170669 filed on Aug. 25, 2014. The entire disclosures of all of the above applications are incorporated herein by reference.

TECHNICAL FIELD

This disclosure relates to a travel control device, a server, and an in-vehicle device which control the travel state of a vehicle.

BACKGROUND ART

Technology for autonomously controlling the speed of a host vehicle to maintain a proper vehicle-to-vehicle distance between the host vehicle and a preceding vehicle that travels ahead of the host vehicle is disclosed. An application of this type of technology is disclosed in Patent Literature 1. According to the technology disclosed in Patent Literature 1, in order for an adjacent-lane vehicle traveling adjacent to a host vehicle to be capable of easily merging ahead of the host vehicle, the distance between the host vehicle and a preceding vehicle is controlled such that a vehicle-to-vehicle distance greater than or equal to the length of the adjacent-lane vehicle is ensured.

Even if a proper vehicle-to-vehicle distance between the host vehicle and the preceding vehicle is maintained by autonomous vehicle state control, when the adjacent-lane vehicle travels right next to and in parallel with the host vehicle, a driver may experience psychological discomfort, and get stressed due to the adjacent-lane vehicle. In particular, when a large vehicle travels exactly adjacent to the host vehicle, an increasing degree of psychological discomfort is given to the driver.

In the related art, for example, in such a technology disclosed in Patent Literature 1, the psychological discomfort of the driver of the host vehicle caused by a peripheral vehicle is not taken into consideration in the adjustment of the travel position of the host vehicle. For this reason, in the related art, it cannot be denied that the driver is likely to experience strong psychological discomfort due to a vehicle that approaches the host vehicle in the travel position adjusted by autonomous control.

PRIOR ART LITERATURES

Patent Literature

Patent Literature 1: JP-2012-104031

SUMMARY OF INVENTION

It is an object of the present disclosure to provide a travel control device, a server, and an in-vehicle device for controlling the travel state of a vehicle so as to reduce psychological discomfort that is experienced by a driver of the vehicle due to a peripheral vehicle.

According to a first aspect of the present disclosure, a travel control device includes: a vehicle detection device configured to detect a position of a peripheral vehicle that travels in a periphery of a host vehicle in a lane, in which the host vehicle travels, or a lane, which is adjacent to and is heading in a same direction as the lane in which the host vehicle travels; a generation device configured to assign a potential field to a predetermined region, which is adjacent to the position of the peripheral vehicle detected by the vehicle detection device, the potential field indicating a degree of psychological pressure received by a driver of the host vehicle, and configured to generate a potential distribution that represents a distribution of the potential field of the peripheral vehicle on a road; and a control device configured to control a travel condition of the host vehicle that the host vehicle travels in the potential field, which is relatively low in the potential distribution generated by the generation device.

The potential fields indicative of the degree of psychological pressure are assigned to the peripheries of the peripheral vehicles based on the viewpoint that psychological pressure is given to a driver due to the fact that the host vehicle travels proximate to the peripheral vehicles traveling in front or back of the host vehicle or in the adjacent lanes. The travel state of the host vehicle is capable of being controlled such that the host vehicle travels avoiding high potential fields based on the distribution of the potential fields across the road. In this manner, psychological pressure given to the driver of the host vehicle due to the peripheral vehicles is capable of being reduced.

According to a second aspect of the present disclosure, a server includes: an acquisition device configured to acquire information regarding positions and travel conditions of a plurality of vehicles which travel on a road having a plurality of lanes heading in a same direction; a generation device configured to assign a potential field to a predetermined region, which is adjacent to a position of each vehicle, based on the information regarding each vehicle acquired by the acquisition device, the potential field indicating a degree of psychological pressure received by a driver of another vehicle, and configured to generate a potential distribution that represents a distribution of the potential field of each vehicle on the road; a determination device configured to determine control information regarding a travel condition of each vehicle that each vehicle travels in the potential field which is relatively low in the potential distribution generated by the generation device; and a transmission device configured to transmit the control information regarding each vehicle, which is determined by the determination device, to another vehicle corresponding to the control information.

The server is capable of collecting the information regarding the plurality of vehicles traveling on the road, and generating the distribution of potential fields indicative of the degree of psychological pressure on the road based on the information regarding each of the vehicles. The items of information, which are used to control the travel states of the vehicles in order for the vehicles to travel avoiding high potential fields, are capable of being integrally determined based on the distribution of the potential fields across the road. Each of the vehicles is notified of the control information determined by the server, the travel state of each of the vehicles is controlled based on the notified control information, and thus psychological pressure given to a driver of each of the vehicles due to the peripheral vehicles is capable of being reduced.

According to a third aspect of the present disclosure, an in-vehicle device includes: a communication device configured to communicate with the server according to the second aspect; a vehicle transmission device configured to transmit information regarding a position and a travel condition of a host vehicle to the server; a vehicle receiving device configured to receive control information, which is determined by the server, from the server; and a control device configured to control the host vehicle according to the control information received by the vehicle receiving device.

The potential fields indicative of the degree of psychological pressure are assigned to the peripheries of the peripheral vehicles based on the viewpoint that psychological pressure is given to a driver due to the fact that the host vehicle travels proximate to the peripheral vehicles traveling in front or back of the host vehicle or in the adjacent lanes. The travel state of the host vehicle is capable of being controlled such that the host vehicle travels avoiding high potential fields based on the distribution of the potential fields across the road. In this manner, psychological pressure given to the driver of the host vehicle due to the peripheral vehicles is capable of being reduced.

BRIEF DESCRIPTION OF DRAWINGS

The above and other objects, features and advantages of the present disclosure will become more apparent from the following detailed description made with reference to the accompanying drawings. In the drawings:

FIG. 11 is a flowchart illustrating the sequence of a driver instruction process.

EMBODIMENTS FOR CARRYING OUT INVENTION

Hereinafter, an embodiment of this disclosure will be described with reference to the drawings. This disclosure is not limited to the embodiment to be described hereinafter, and may be realized in various forms.

Figure 1:
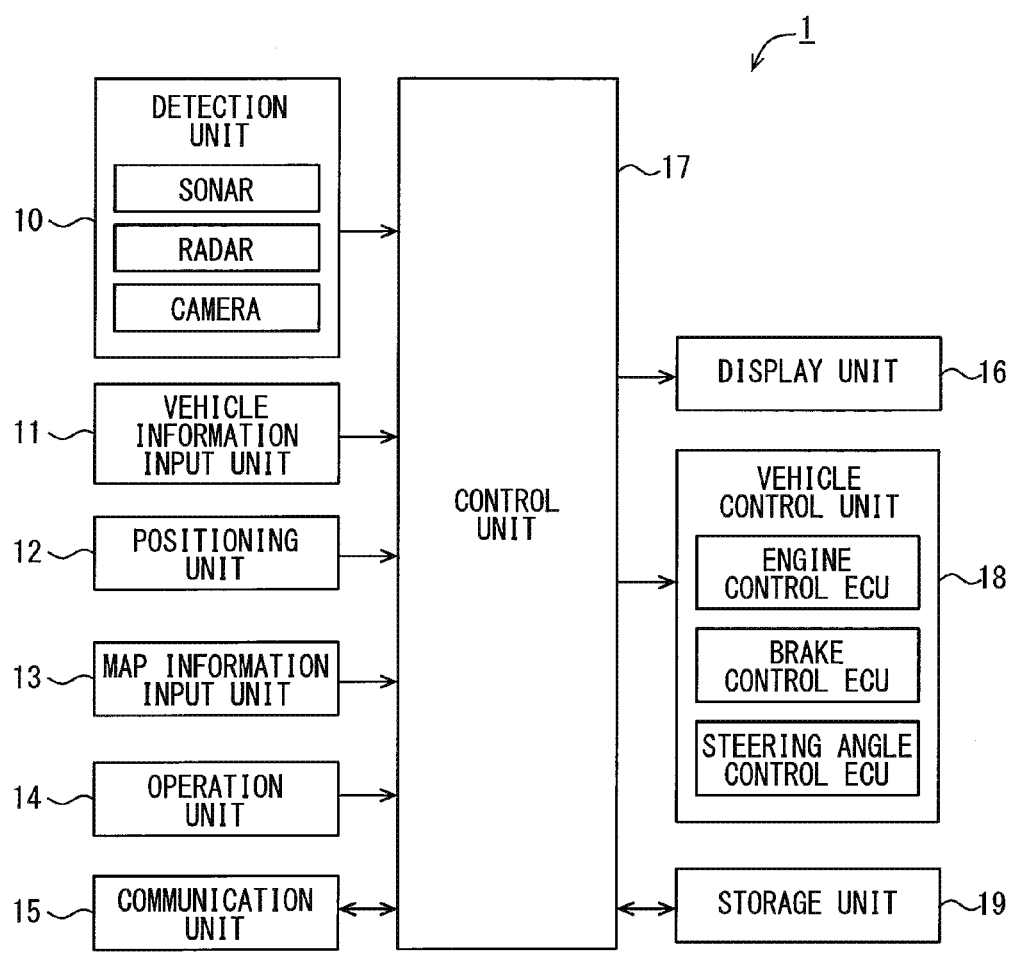
FIG. 1 is a block diagram illustrating a schematic configuration of a travel control system in a first embodiment.

First Embodiment: Description of Configuration of Autonomous Travel Control System As illustrated in FIG. 1, a travel control system 1 in a first embodiment includes a detection unit 10; a vehicle information input unit 11; a positioning unit 12; a map information input unit 13; an operation unit 14; a communication unit 15; a display unit 16; a control unit 17; a storage unit 19; and the like.

The detection unit 10 is configured to include sensors which detect the positions, the relative speeds, and the sizes of peripheral vehicles which travel in a lane in which a host vehicle travels, and in adjacent lanes. The detection unit 10 is realized by a sonar device, a radar device, a camera, and the like.

The sonar device transmits ultrasound waves to predetermined regions via antennas which face the front, the rear, the right and the left of the host vehicle, and receives the reflected waves. The sonar device outputs positional relationships, distances, and the like between the host vehicle and objects that are present on front, rear, right, or left sides of the host vehicle, based on the received reflected waves. The radar device emits laser beams or millimeter waves via antennas which face the front, the rear, the right, and the left of the host vehicle, scans predetermined detected regions, and receives the reflected waves. The radar device outputs positional relationships, distances, relative speeds and the like between the host vehicle and objects that are present on the front, rear, right, and left sides of the host vehicle, based on the received reflected waves. The cameras are respectively provided at predetermined positions in front, rear, right, and left portions of the host vehicle, and output image data for peripheral vehicles that are present on the front, rear, right, and left sides of the host vehicle. A combination of sonar devices, radar devices, cameras, and the like of the sensors may be used, or a single sonar device, a single radar device, a single camera, and the like may be used.

The vehicle information input unit 11 inputs travel control information indicative of the state of the host vehicle to the control unit 17. Examples of the information regarding the state of the host vehicle include a speed, an accelerator pedal opening, the amount of brake pedal depression, a steering angle, and the like. The positioning unit 12 positions a current location of the host vehicle. The positioning unit 12 is realized by a high-precision position receiver or the like that corresponds to a high-precision global positioning system (GPS). The map information input unit 13 acquires information regarding a road (on which the host vehicle is currently traveling) from a storage medium that stores road map information, and inputs the acquired road information to the control unit 17. In this embodiment, information regarding the number of lanes, a lane width, a curve, a slope, a junction, a regulation, or the like is assumed to be the road information which is input by the map information input unit 13.

The operation unit 14 is an input device for inputting operation instructions such as the turning on and off of the travel control, and the turning on and off of a display of a potential distribution image, and is realized by a switch or the like that is provided in a spoke portion of the steering wheel of the vehicle. The communication unit 15 is a communication device that performs road-to-vehicle communication between the host vehicle and a radio communication station on a roadside or vehicle-to-vehicle communication between the host vehicle and a communicator mounted in a peripheral vehicle. The display unit 16 is a display device that is formed of a center display provided in a central portion of an instrument panel, and an indicator provided inside a meter panel. The center display displays a potential distribution image rendered by the control unit 17. The indicator inside the meter panel displays a turn-on and off state of the travel control.

The control unit 17 is an information processing device that is configured to include a CPU, a ROM, a RAM, and the like (not illustrated) as main elements, and integrally controls each part of the travel control system 1. The control unit 17 executes various processes by causing the CPU to execute a control program stored in the ROM. A vehicle control unit 18 is connected to the control unit 17, and is a control target that is controlled via a travel control process executed by the control unit 17.

In this embodiment, various electronic control devices such as an engine control ECU, a brake control ECU, and a steering angle ECU are assumed to be vehicle control units 18. The engine control ECU controls engine output by outputting a control command according to the amount of accelerator pedal depression or the state of an engine. The brake control ECU controls the braking force of a brake pedal according to the amount of brake pedal depression. The steering angle ECU controls the steering angle of the steering wheel. The control unit 17 autonomously controls the travel state of the vehicle by outputting commands to the engine control ECU, the brake control ECU, and the steering angle control ECU in the travel control process to be described below.

The storage unit 19 is a storage device that stores learning information regarding driving behaviors of the host vehicle. The control unit 17 causes the storage unit 19 to record driving behavior information as the learning information, with the driving behavior information indicative of the vehicle-to-vehicle distance between the host vehicle and a peripheral vehicle, and the position of a lane in which the host vehicle has traveled, all of which are acquired based on information items input from the detection unit 10, the vehicle information input unit 11, the positioning unit 12, the map information input unit 13, and the like.

[Description of Main Process]

The sequence of a main process executed by the control unit 17 of the travel control system 1 will be described with reference to the flowchart illustrated in FIG. 2. This process is repeatedly executed at predetermined control intervals.

In S100, the control unit 17 senses the periphery of the host vehicle via the detection unit 10. The position, the size, the relative speed, and the like of each vehicle present in the periphery of the host vehicle are detected. The peripheral vehicles are detected based on the recognition of an image captured by the camera of the detection unit 10, or results measured by the radar device, the sonar device, and the like. The lane in which the host vehicle travels is recognized by recognizing white lines in an image captured by the camera. In S102, the control unit 17 prepares a bird's eye view image based on the positions of the peripheral vehicles detected in S100, the position of the host vehicle, and the road map information, with the bird's eye view image illustrating a positional relationship on a road between the host vehicle and each of the peripheral vehicles. The bird's eye view image has a composition in which the positional relationship between the host vehicle and each of the peripheral vehicles in the host vehicle lane and adjacent lanes which are heading in the same direction is overlooked from an upper side of the host vehicle, and in this image, the host vehicle and the peripheral vehicles are disposed at the corresponding positions in regions in which the lanes and the shape of the road are reproduced.

In S104, the control unit 17 assigns a potential field to each peripheral vehicle in the bird's eye view image prepared in S102, and prepares a potential distribution illustrating a state in which the potential fields of the peripheral vehicles are integrally distributed across the entire region of the bird's eye view image. The potential field conceptually represents the degree of psychological discomfort that is given to the driver of the host vehicle due to the presence of a peripheral vehicle, with the degree of psychological discomfort being associated with the position of the peripheral vehicle on the road. In this embodiment, the following method is exemplified as a specific potential field calculation method.

The value of a potential field is added to a region that is bound by a predetermined safety distance from a front end or a rear end of a peripheral vehicle in a forward and rearward direction of the peripheral vehicle. The width of the potential field assigned in the forward and rearward direction of the peripheral vehicle is set to the width of a lane in which the peripheral vehicle is present. The value of a potential field, which is separated by the safety distance or greater in the forward and rearward direction, is set to zero. The value of a potential field in the region bound by less than the safety distance may be set to be increased to the extent that the potential field is close to the peripheral vehicle, or may be set to a constant value regardless of the distance between the potential field and the peripheral vehicle. The safety distance is deemed to be changeable according to the speed of the host vehicle (or the speed of the peripheral vehicle), and for example, the safety distance is set to 22 m at a host vehicle speed of 40 km/h, 44 m at a host vehicle speed of 60 km/h, or 112 m at a host vehicle speed of 100 km/h. When it rains (when a windshield wiper is in operation), the safety distance may be set to 1.5 times the safety distance under normal conditions. Alternatively, the potential field value may be set to be increased to the extent that the speed of the host vehicle or the speed of the peripheral vehicle is high.

The peripheral vehicle is assumed to affect one lane region in a rightward and leftward direction of the peripheral vehicle, with the one lane region being adjacent to a lane in which the peripheral vehicle is present, and the value of a potential field is added to a region that is equivalent to the total length of the peripheral vehicle and the width of an adjacent lane. The value of a potential field positioned outside of the width of one lane is set to zero.

Taking into consideration that psychological discomfort is increasingly given to the driver of the host vehicle to the extent that a peripheral vehicle traveling in proximity of the host vehicle is large, the value or the range of a potential field may be adjusted according to the size of the peripheral vehicle. For example, it is deemed that a potential field is assigned to a wide region, or the value of the potential field is increased to the extent that the detection unit 10 detects a large vehicle height. In addition, the value of the potential field assigned in the rightward and leftward direction of the peripheral vehicle is deemed to be increased to the extent that the detection unit 10 detects a large vehicle width.

The value or the range of a potential field assigned to a peripheral vehicle may be adjusted according to road conditions such as the width, the curve, the slope of a road represented by the road map information. Specifically, it is deemed that a potential field is assigned to a wide range, or the value of the potential field is set to be greater than normal conditions when the host vehicle travels on a road, the width of which is narrower than or equal to a standard width, or the curve or the slope of which is greater than or equal to a standard curve or slope. Under bad weather conditions such as rainy, stormy, or foggy weather, a potential field may be assigned to a wide range, or the value of the potential field may be set to be greater than normal conditions, based on weather information acquired by the communication unit 15, or a weather sensor or the like mounted in the vehicle. The travel control system 1 may be configured such that a user can arbitrarily change the standard for the extent or the value of a potential field via the operation unit 14.

Alternatively, the value or the range of the potential field assigned to a peripheral vehicle is deemed to be changeable based on the tendency of driving behaviors which are represented by the learning information recorded in the storage unit 19. For example, when a driver tends to maintain a relatively short (or long) vehicle-to-vehicle distance, it is deemed that the range of a potential field that is assigned to the rearward of the peripheral vehicle is set to be short (or long) based on learning information regarding the vehicle-to-vehicle distance. It is deemed that the height of a potential field assigned to a lane in which a driver travels often is set to be relatively low, and the height of a potential field assigned to a lane in which a driver travels rarely is set to be relatively large, based on learning information regarding the position of a lane in which the host vehicle has traveled.

Figure 4A:
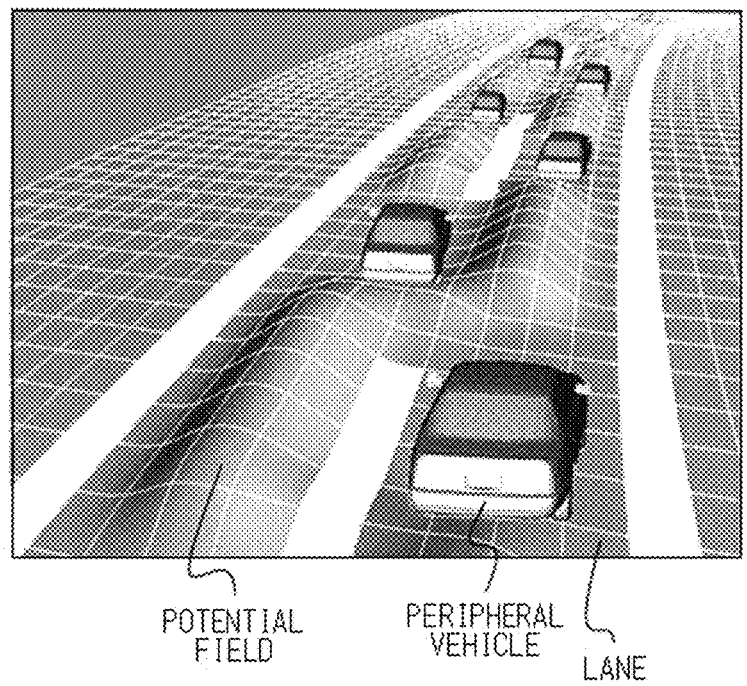
FIG. 4A is an image illustrating a concept of a potential distribution.
Figure 4B:
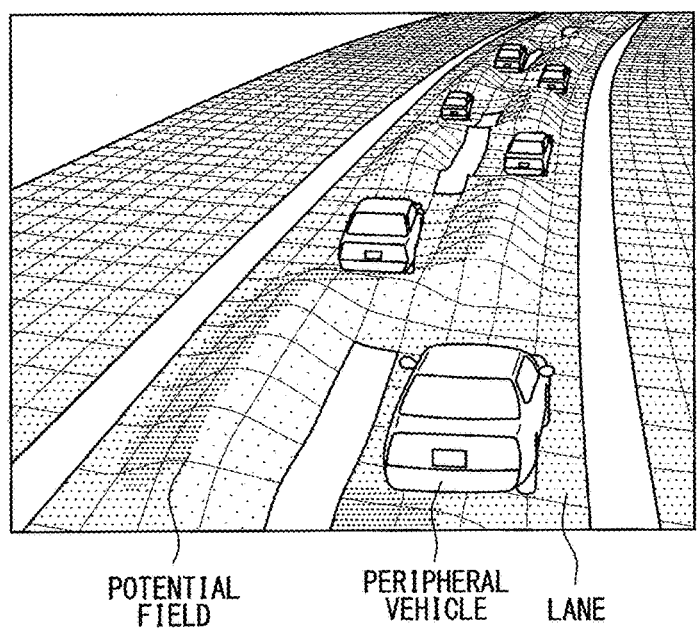
FIG. 4B is a schematic view illustrating the light and shade of the potential distribution in FIG. 4A using dots.

FIGS. 4A and 4B abstractly illustrate the potential distribution prepared in S104. In the example illustrated in FIGS. 4A and 4B, potential fields, which are formed in regions adjacent to peripheral vehicles in the forward and rearward direction and the rightward and leftward direction, are illustrated as upheavals of a road surface. That is, a high potential field illustrated as an upheaval of the road surface implies that strong psychological discomfort is given to the driver of the host vehicle.

Figure 2:
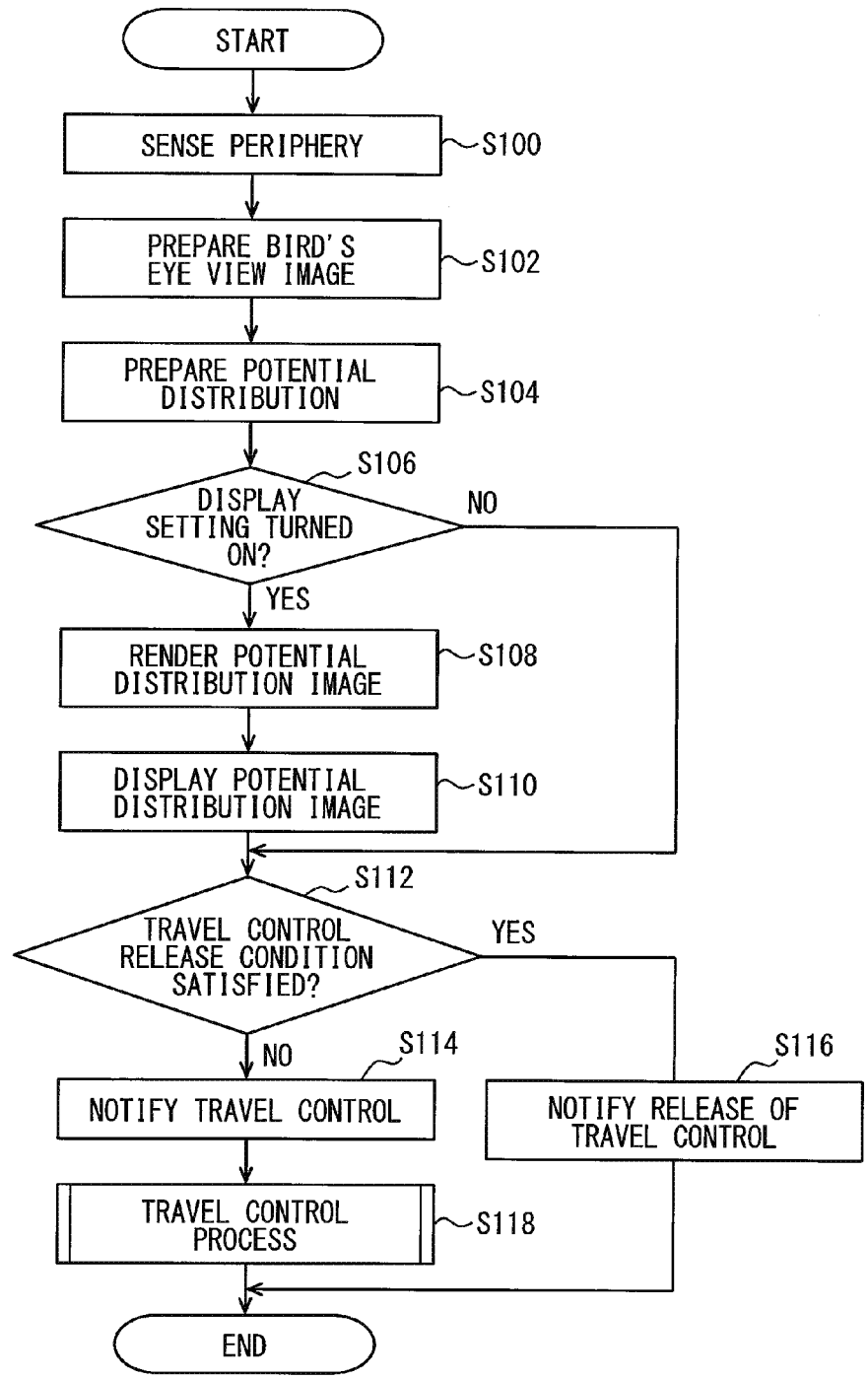
FIG. 2 is a flowchart illustrating the sequence of a main process.

The description will continue with the flowchart illustrated in FIG. 2. In S106, the control unit 17 branches the process according to whether a setting for displaying an image of visualizing the potential distribution is turned on. In this embodiment, the driver can turn on and off a display via the steering switch of the operation unit 14 at any time. When the setting for displaying the potential distribution image is turned off (NO: S106), the control unit 17 causes the process to proceed to S112. In contrast, when the setting for displaying the potential distribution image is turned on (YES: S106), the control unit 17 causes the process to proceed to S108.

Figure 5A:
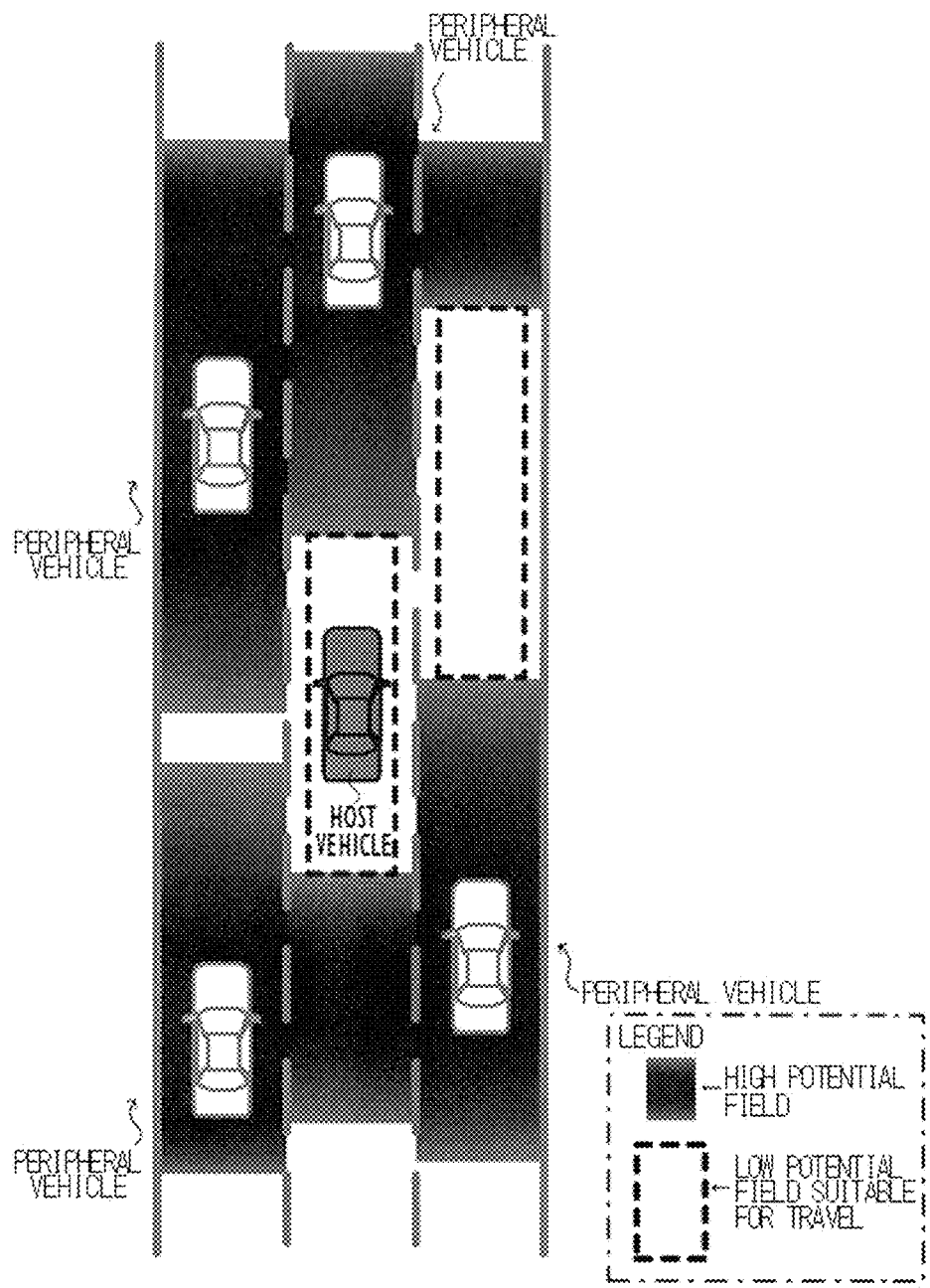
FIG. 5A is a view illustrating an example of a display of a potential distribution.
Figure 5B:
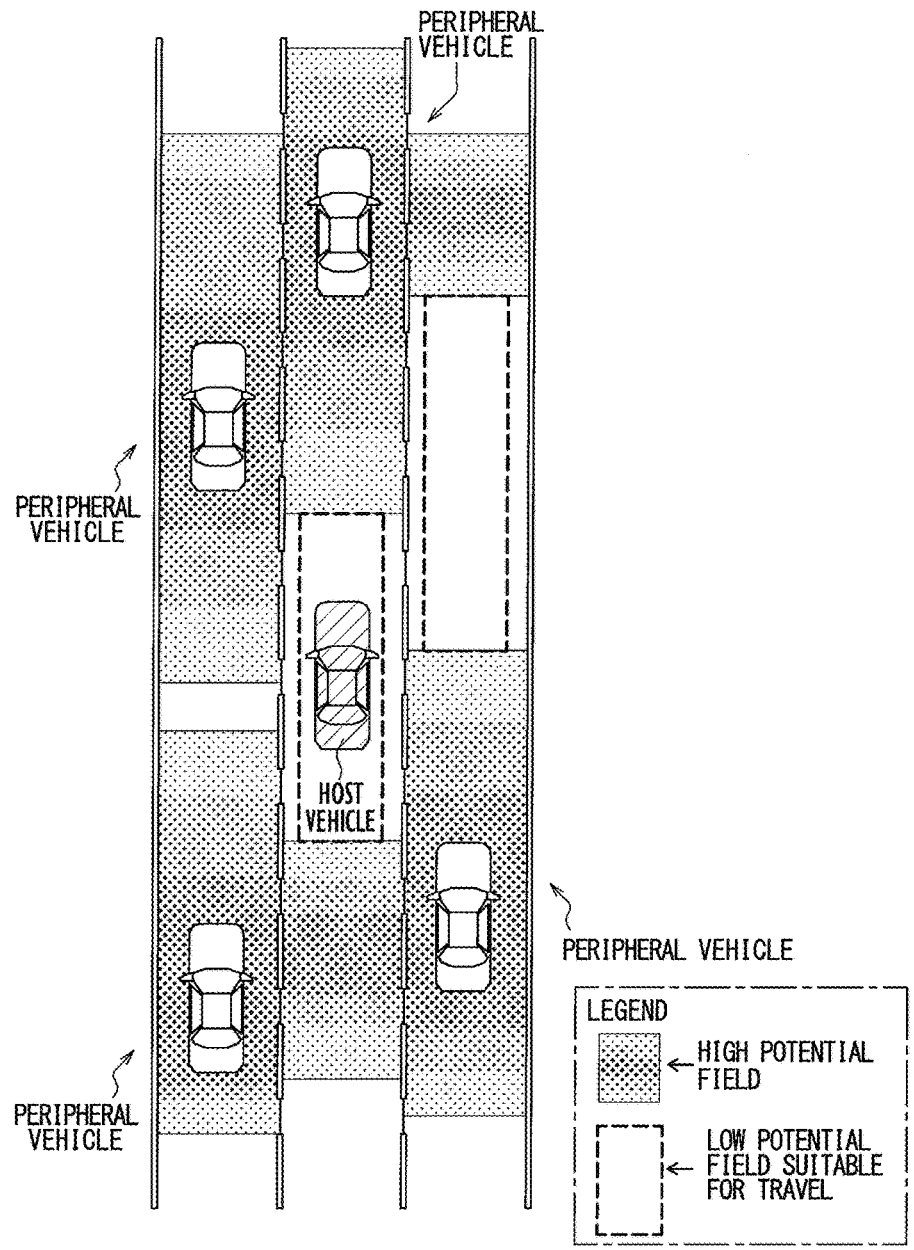
FIG. 5B is a schematic view illustrating the light and shade of the potential distribution in FIG. 5A using dots.

In S108, the control unit 17 renders a virtual image of visualizing the potential distribution prepared in S104. A specific example of the potential distribution image rendered in S108 will be described with reference to FIGS. 5A and 5B. As illustrated in FIGS. 5A and 5B, the potential distribution image is rendered with a composition in which a road in the periphery of the host vehicle is overlooked from the upper side of the host vehicle. Images of the detected peripheral vehicles are rendered in regions which are positioned relative to the host vehicle in a road image. A potential field is rendered on the circumference of the image of each of the peripheral vehicles.

In the example illustrated in FIGS. 5A and 5B, a potential field is expressed by the color depth of an image, and a potential field is rendered in a deep color to the extent that the value of the potential field is large. A low potential field is defined to be a region outside the range of a potential field that is formed due to a peripheral vehicle. Alternatively, the low potential field may include a range in which the value of a potential field is less than or equal to a reference value. In the example illustrated in FIGS. 5A and 5B, when a wide range of a low potential field greater than the total length of the host vehicle is present in a range to which the host vehicle can move from the current position, the range of the potential field is highlighted with a dotted line of a rectangle. Accordingly, the low potential field suitable for the travel of the host vehicle is clearly indicated. In the example illustrated in FIGS. 5A and 5B, the potential distribution is rendered as a two-dimensional bird's eye view image; however, as illustrated in FIGS. 4A and 4B, the potential distribution may be rendered as a three-dimensional stereoscopic image.

The description will continue with the flowchart illustrated in FIG. 2. In S110, the control unit 17 displays the potential distribution image rendered in S108 on the center display of the display unit 16. In S112, the control unit 17 branches the process according to whether a current state of the host vehicle satisfies travel control release conditions. In this embodiment, the driver can set the turning on and off of the travel control via the steering switch of the operation unit 14 at any time, which is an example of the travel control release conditions. In another example of the travel control release conditions, the travel control is released on the condition that traffic congestion is determined to occur ahead of the route of the host vehicle based on a state of a traffic flow in the periphery of the host vehicle detected by the detection unit 10, or traffic congestion information received via the communication unit 15. Thereafter, the travel control resumes on the condition that information indicative of the clearing of the traffic congestion is acquired.

When the travel condition release conditions are not satisfied (NO: S112), the control unit 17 causes the process to proceed to S114. In S114, via the display unit 16, the control unit 17 notifies the driver that the travel control is performed. Specifically, the indicator inside the meter panel displays an on-state of the travel control. In subsequent S118, the control unit 17 executes the travel control process based on the potential distribution prepared in S104. The sequence of the travel control process will be described in detail later. After S118, the control unit 17 ends this process.

In contrast, when it is determined in S112 that the travel control release conditions are satisfied (YES: S112), the control unit 17 causes the process to proceed to S116. In S116, via the display unit 16, the control unit 17 notifies the driver that the travel control is not performed. Specifically, the indicator inside the meter panel displays an off-state of the travel control. After S116, the control unit 17 ends this process.

[Description of Travel Control Process]

Figure 3:
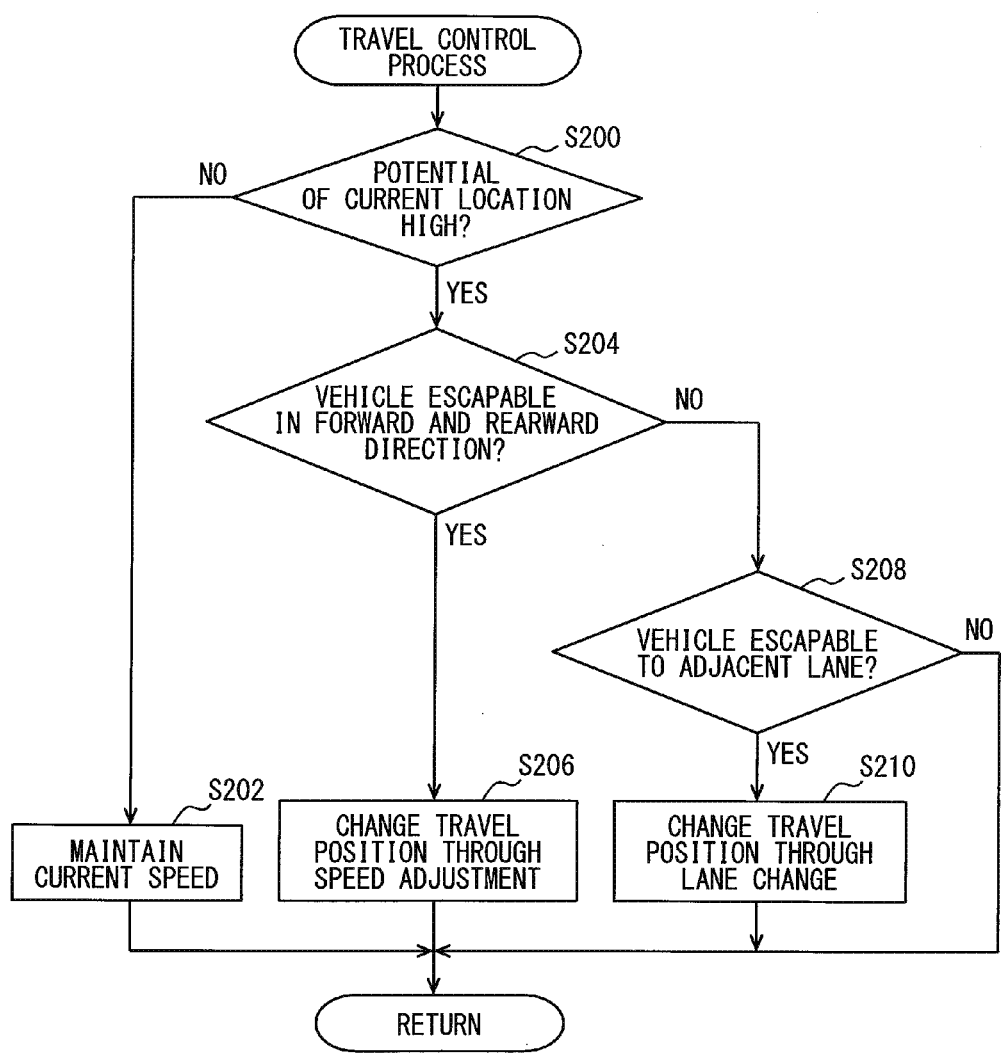
FIG. 3 is a flowchart illustrating the sequence of a travel control process.

The sequence of the travel control process executed by the control unit 17 of the travel control system 1 will be described with reference to the flowchart illustrated in FIG. 3. The travel control process is a process that is executed in S118 of the aforementioned main process (refer to FIG. 2).

In S200, the control unit 17 determines whether the position of the host vehicle has a high potential in the potential distribution prepared in S104. When the host vehicle is positioned in a low potential field (NO: S200), the control unit 17 causes the process to proceed to S202. The low potential field referred to here indicates a region outside a potential field that is formed due to a peripheral vehicle. Alternatively, the low potential field may include a range in which the value of a potential field formed due to a peripheral vehicle is less than or equal to the reference value. In S202, the control unit 17 commands the engine control ECU of the vehicle control unit 18 to maintain a current speed.

In contrast, when it is determined in S200 that the host vehicle is positioned in a high potential field (YES: S200), the control unit 17 causes the process to proceed to S204. The high potential field referred to here indicates a range bound within a potential field that is formed due to a peripheral vehicle. Alternatively, a potential field formed due to a peripheral vehicle, the value of which is less than or equal to the reference value, may be excluded from the high potential field. In S204, based on the potential distribution prepared in S104, the control unit 17 determines whether the host vehicle is capable of escaping from a high potential field to a low potential field by changing the position of the host vehicle relative to the peripheral vehicles in the forward and rearward direction while maintaining a current travel lane. For example, an affirmative determination is made on the condition that a sufficient size of a low potential field is present in front or back of the travel lane of the host vehicle, and other vehicles are not present in the travel lane between the host vehicle and the low potential field.

When the host vehicle moves in the forward and rearward direction such that the host vehicle is capable of escaping to the low potential field (YES: S204), the control unit 17 causes the process to proceed to S206. In S206, the control unit 17 commands the engine control ECU or the brake control ECU of the vehicle control unit 18 to adjust the speed of the host vehicle such that the host vehicle enters the low potential field in front or back thereof in the travel lane. The control unit 17 may be configured to notify the driver of a voice message or the like indicative of the change of speed in advance.

In contrast, when it is determined in S204 that the host vehicle is incapable of escaping from a high potential field in the forward and rearward direction (NO: S204), the control unit 17 causes the process to proceed to S208. In S208, the control unit 17 determines whether the host vehicle is capable of escaping to a low potential field by changing a lane to an adjacent lane from the travel lane of the host vehicle. For example, one condition for making an affirmative determination is that a sufficient size of a low potential field is present in a range in which the host vehicle is capable of entering the adjacent lane through the lane change. When changing a lane, the host vehicle may overtake peripheral vehicles traveling in the adjacent lane. Another condition for making an affirmative determination is that the host vehicle travels through a straight region with an unobstructed view in which the lane change (or overtaking) is not prohibited, based on road conditions represented by the road map information or regulations. That is, it is determined that the host vehicle is incapable of escaping from a high potential field through the lane change at a junction point, a curve, a steep slope, or in a lane-change (or overtaking) prohibited region.

When the host vehicle is capable of escaping to a low potential field through the lane change (YES: S208), the control unit 17 causes the process to proceed to S210. In S210, the control unit 17 commands the engine control ECU, the brake control ECU, or the steering angle control ECU of the vehicle control unit 18 to adjust the speed and perform the steering of the host vehicle such that the host vehicle enters a low potential field in an adjacent lane through the lane change or overtaking. The control unit 17 may be configured to notify the driver of a voice message or the like indicative of the change of lane or overtaking in advance. In contrast, when it is determined in S208 that the host vehicle is incapable of escaping to a low potential field through the lane change (NO: S208), the control unit 17 does not perform the travel control, and ends this process.

[Effects]

According to the travel control system 1 in the first embodiment, the following effects are obtained.

A potential field indicative of the degree of psychological discomfort is assigned to the periphery of a peripheral vehicle in the forward and rearward direction and the rightward and leftward direction, based on the viewpoint that psychological discomfort is given to the driver due to the presence of a peripheral vehicle that travels in front or back or adjacent to the host vehicle while being proximate to the host vehicle. The travel control is capable of being performed to change the position of the host vehicle relative to a peripheral vehicle via the adjustment of speed, to change a lane, or to overtake, based on the distribution of potential fields on a road, and thus, the host vehicle travels avoiding high potential fields. Accordingly, psychological discomfort given to the driver of the host vehicle due to the peripheral vehicle is capable of being reduced.

A speed, the size of a peripheral vehicle, road conditions, and weather conditions are capable of being reflected in the calculation of a potential field. Accordingly, an optimized potential distribution is capable of being prepared according to a speed or a peripheral state, and the travel control is capable of being more accurately realized based on the optimized potential distribution. The visualized potential distribution image (refer to FIGS. 5A and 5B) is capable of being displayed for the driver, and thus the driver can easily understand the route of travel to be taken which is capable of reducing psychological discomfort caused by a peripheral vehicle, which is convenient. The execution of the travel control is capable of being restricted under conditions such as traffic congestion, a curve, a steep slope, or a junction. Accordingly, the travel control is capable of being executed under safer conditions.

Figure 6:
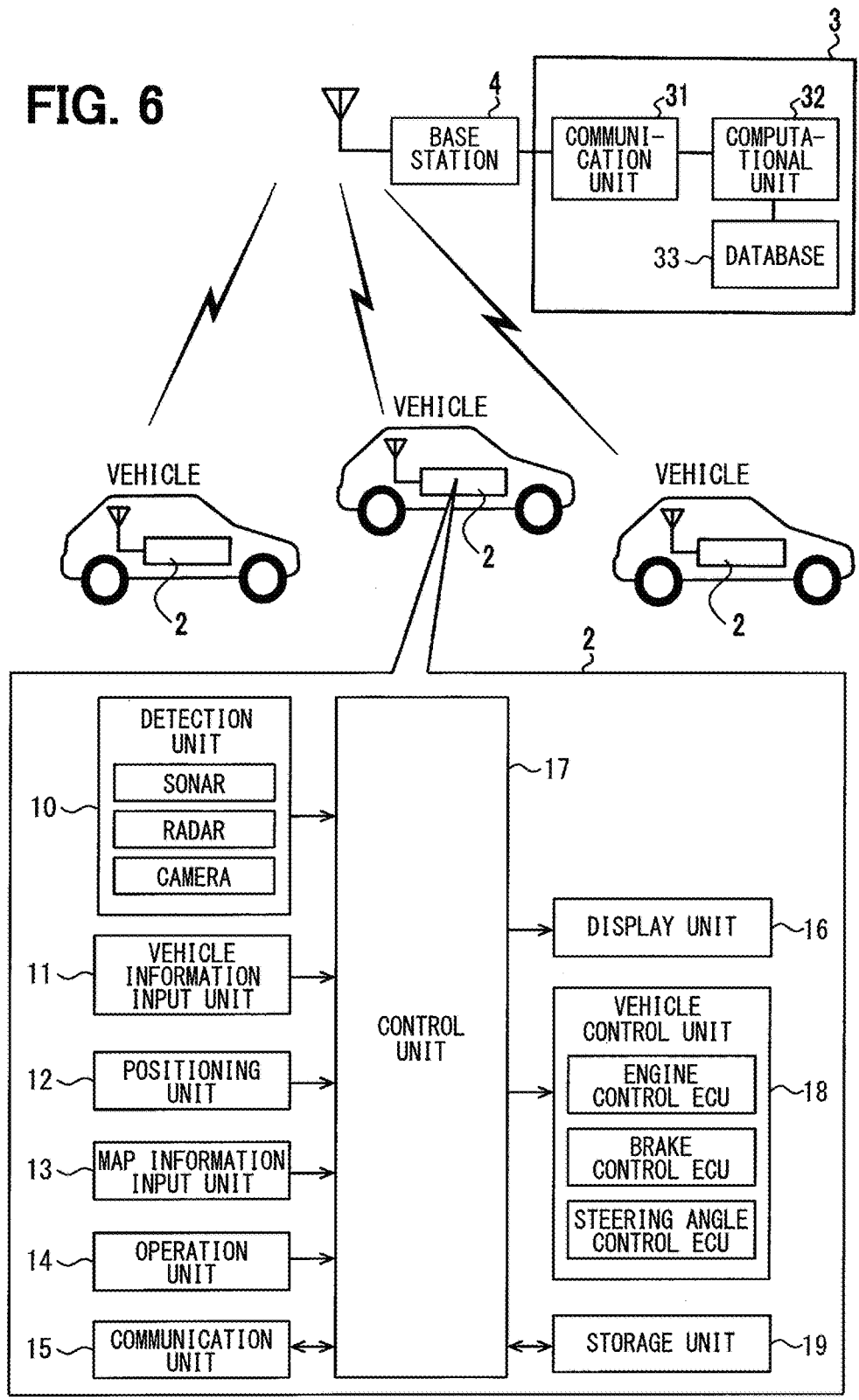
FIG. 6 is a block diagram illustrating a schematic configuration of a server and an in-vehicle device in a second embodiment.

Second Embodiment: Description of Configuration of Server-Managed Travel Control System Hereinafter, a server-managed travel control system in a second embodiment will be described. As illustrated in FIG. 6, the server-managed travel control system is configured to include in-vehicle devices 2 mounted in multiple vehicles traveling on a road, and a server 3 that is installed at an information center for providing information to vehicles in a wide area. The second embodiment is different from the first embodiment in that the server 3 integrally prepares the potential distribution, or determines the vehicle control of multiple vehicles.

Similar to the travel control system 1 in the first embodiment, the in-vehicle device 2 includes the detection unit 10; the vehicle information input unit 11; the positioning unit 12; the map information input unit 13; the operation unit 14; the communication unit 15; the display unit 16; the control unit 17; the vehicle control unit 18; the storage unit 19; and the like. The same reference signs are assigned to the same configuration elements as in the travel control system 1 in the first embodiment, and the descriptions of common functions will be omitted. The communication unit 15 of the in-vehicle device 2 wirelessly communicates with the server 3 via a base station 4 of a wide area network.

The server 3 is an information processing device that is installed at an institution (information center) for providing various information items to vehicles in a wide area. The server 3 communicates with the in-vehicle device 2 via the base stations 4 provided in a wide area, and a wireless communication network. The server 3 includes a communication unit 31 that communicates with the outside via the base station 4; a computational unit 32; a database 33; and the like. The server 3 collects various information items which are uploaded from many vehicles traveling on a road. The computational unit 32 prepares travel control information regarding the vehicles based on the information collected from the vehicles, and transmits the control information to the vehicle. The database 33 stores learning information regarding driving behaviors of the vehicles that provide the information items to the server 3. The computational unit 32 causes the database 33 to record driving behavior information regarding the vehicles, for example, a vehicle-to-vehicle distance or the position of a traveled lane based on the information uploaded from the vehicles, as learning information, with the driving behavior information being associated with identification information regarding the vehicles.

[Description of Information Transmission Process]

Figure 7:
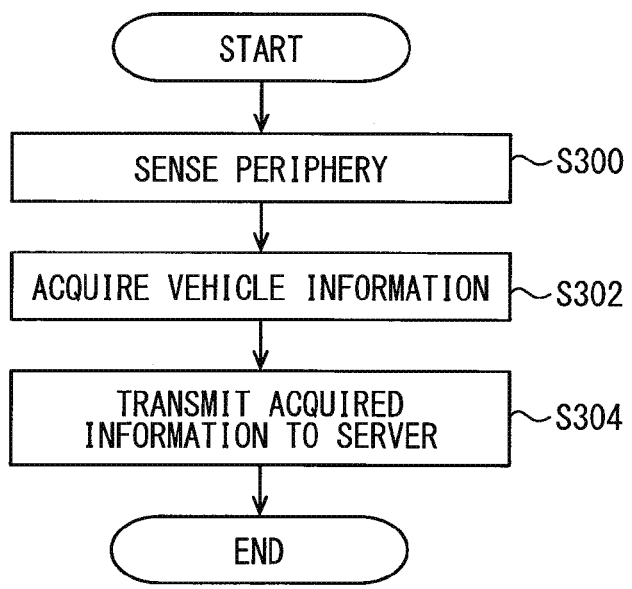
FIG. 7 is a flowchart illustrating the sequence of an information transmission process.

The sequence of an information transmission process executed by the control unit 17 of the in-vehicle device 2 will be described with reference to the flowchart illustrated in FIG. 7. This process is repeatedly executed at predetermined control intervals while a vehicle with the in-vehicle 2 travels.

In S300, the control unit 17 senses the periphery of the host vehicle via the detection unit 10. The position, the size, the relative speed, and the like of each vehicle present in the periphery of the host vehicle are detected. The peripheral vehicles are detected based on the recognition of an image captured by the camera of the detection unit 10, or results measured by the radar device, the sonar device, and the like. The lane in which the host vehicle travels is recognized by recognizing white lines in an image captured by the camera. In S302, the control unit 17 acquires information regarding the state or a current location of the host vehicle from the vehicle information input unit 11 and the positioning unit 12. Examples of the information regarding the state of the host vehicle include a speed, an accelerator pedal opening, the amount of brake pedal depression, a steering angle, and the like.

In S304, the control unit 17 transmits the information acquired in S300 and S302 to the server 3 with the information being associated with the host vehicle identification information (vehicle ID). The information transmitted to the server 3 in S304 also includes information indicative of whether autonomous drive control for autonomously adjusting a speed or performing steering operations can be enabled. After S304, the control unit 17 ends this process.

[Description of Main Process]

Figure 8:
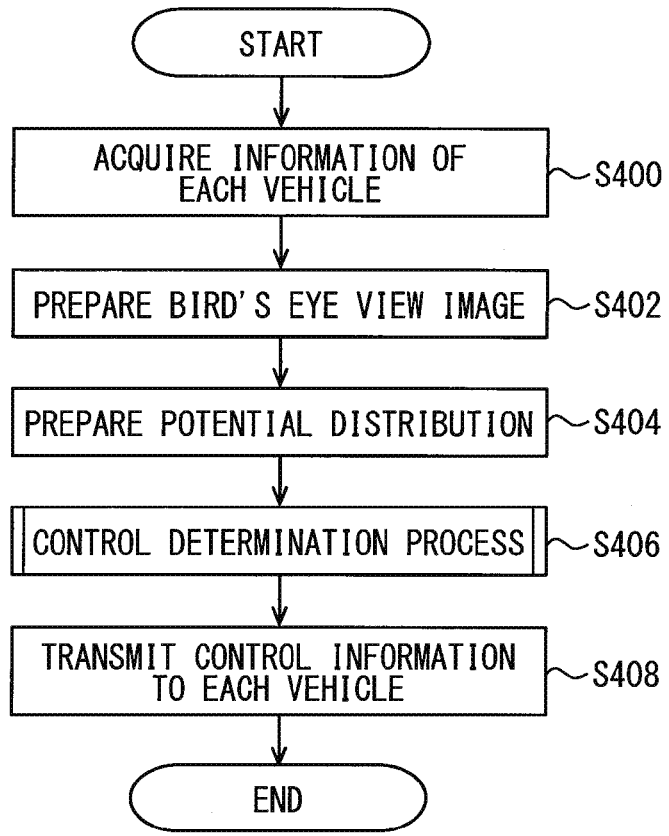
FIG. 8 is a flowchart illustrating the sequence of a main process.

The sequence of the main process executed by the computational unit 32 of the server 3 will be described with reference to the flowchart illustrated in FIG. 8. This process is repeatedly executed at predetermined control intervals while the server 3 is in operation.

In S400, the computational unit 32 acquires information transmitted from multiple vehicles which travel in a predetermined road section. The computational unit 32 may acquire information regarding vehicles which are detected by cameras, sensors, or the like installed as infrastructure in the road section. In S402, the computational unit 32 prepares a bird's eye view image illustrating positional relationships between the vehicles on the road, based on the information received from the vehicles in S400, and road map information regarding the current location. The bird's eye view image has a composition in which the positional relationships between all of the vehicles traveling in the predetermined road section in the same direction are overlooked from above, and in this image, the vehicles are disposed at the corresponding positions in regions in which the lanes and the shape of the road are reproduced. The vehicles disposed in the bird's eye view image include not only the vehicles with the in-vehicle device 2 which provide the information to the server 3, but also peripheral vehicles which are detected by the sensors of the vehicles with the in-vehicle device 2.

In S404, the computational unit 32 assigns a potential field to each peripheral vehicle in the bird's eye view image prepared in S402, and prepares a potential distribution illustrating a state in which the potential fields of the vehicles are integrally distributed across the entire region of the bird's eye view image. The potential field conceptually represents the degree of psychological discomfort that is given to drivers of other peripheral vehicles due to the presence of each vehicle, with the degree of psychological discomfort being associated with the position of the vehicle on the road. A specific potential field calculation method is same as that described in S104 (refer to FIG. 2) in the first embodiment, and thus, duplication descriptions will be omitted.

In S406, the computational unit 32 executes a control determination process based on the potential distribution prepared in S404. The control determination process will be described in detail later. In S408, the computational unit 32 transmits the autonomous drive control information or information regarding an instruction to a driver, which are determined through the control determination process in S406, to the corresponding vehicle. In S408, the computational unit 32 transmits image information for virtually visualizing the potential distribution prepared in S404 to each of the vehicles. After S408, the computational unit 32 ends this process.

[Description of Control Determination Process]

Figure 9:
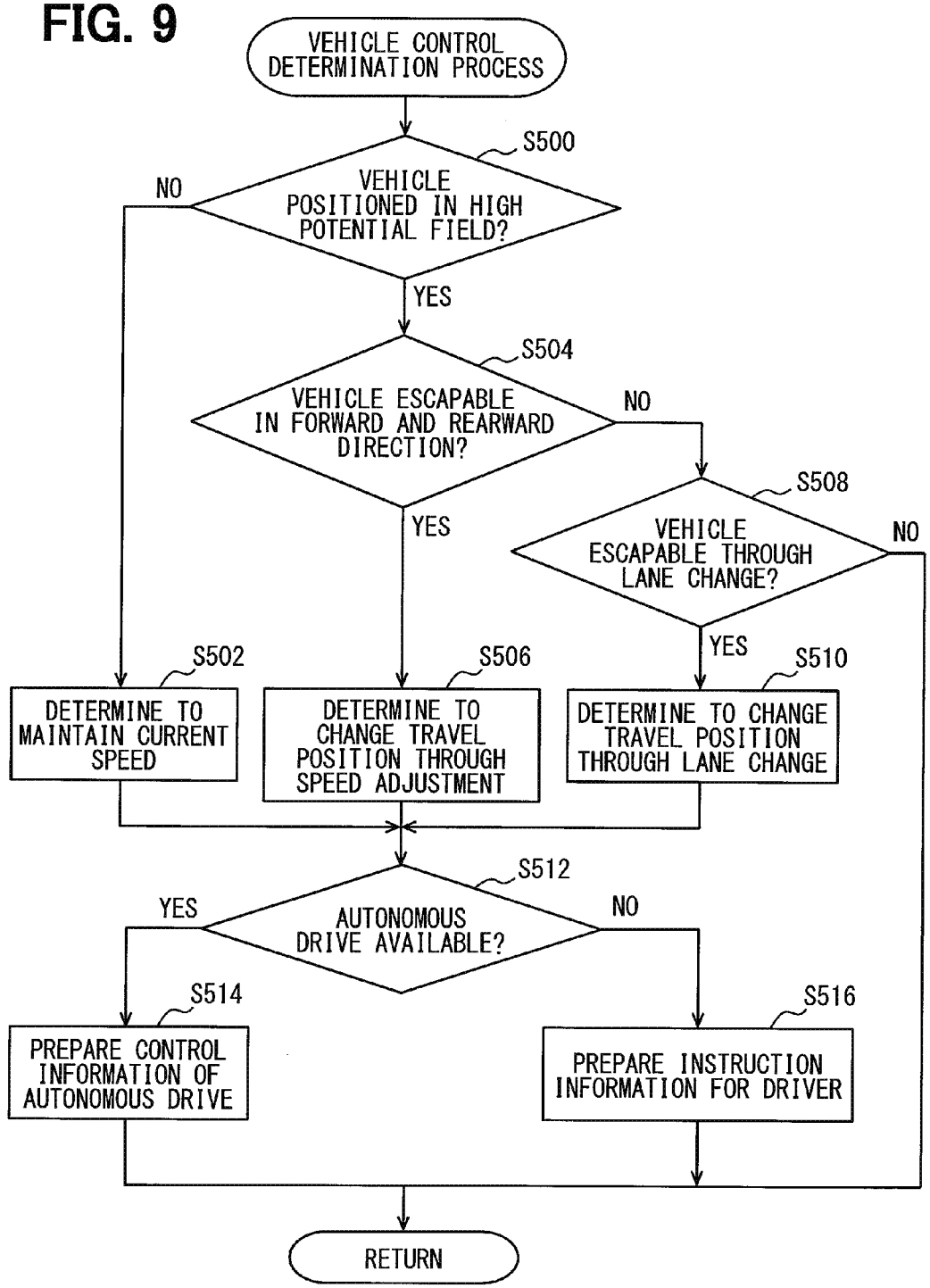
FIG. 9 is a flowchart illustrating the sequence of a control determination process.

The sequence of the control determination process executed by the computational unit 32 of the server 3 will be described with reference to the flowchart illustrated in FIG. 9. The control determination process is a process that is executed in S406 of the aforementioned main process (refer to FIG. 8).

In S500, the computational unit 32 determines whether a vehicle is present at a position corresponding to a high potential field in the potential distribution prepared in S404. The high potential field referred to here indicates a range bound within a potential field that is formed due to another vehicle present in the periphery of a vehicle. Alternatively, potential fields formed due to other vehicles, the values of each of which is less than or equal to a reference value, may be excluded from the high potential field.

When a vehicle is not present in a high potential field (NO: S500), the computational unit 32 causes the process to proceed to S502. In S502, the computational unit 32 determines control content, according to which the vehicles with the in-vehicle device 2 maintain current speeds.

In contrast, when it is determined in S500 that a vehicle is positioned in a high potential field (YES: S500), the computational unit 32 causes the process to proceed to S504. In S504, the computational unit 32 determines whether the vehicle is capable of escaping from the high potential field when, among the vehicle and other vehicles in the periphery of the vehicle which are present in the high potential field, the position of a vehicle with the in-vehicle device 2 is changed relative to peripheral vehicles in the forward and rearward direction.

When a vehicle moves in the forward and rearward direction such that the vehicle is capable of escaping from the high potential field (YES: S504), the computational unit 32 causes the process to proceed to S506. In S506, the computational unit 32 determines control content, according to which the speed of a specific vehicle, a specific target for travel control, is adjusted, and the travel position of the vehicle is changed such that the vehicle escapes from the high potential field.

In contrast, when it is determined in S504 that a vehicle is incapable of escaping from the high potential field even if the vehicle moves in the forward and rearward direction (NO: S504), the computational unit 32 causes the process to proceed to S508. In S508, the computational unit 32 determines whether the vehicle is capable of escaping from the high potential field when, among the vehicle and other vehicles in the periphery of the vehicle which are present in the high potential field, the position of a vehicle with the in-vehicle device 2 is changed through the lane change. For example, one condition for making an affirmative determination is that a sufficient size of a low potential field is present in a range in which the host vehicle is capable of entering the adjacent lane through the lane change. When changing a lane, the host vehicle may overtake peripheral vehicles traveling in the adjacent lane. Another condition for making an affirmative determination is that the host vehicle travels through a straight region with an unobstructed view in which the lane change (or overtaking) is not prohibited, based on road conditions represented by the road map information or regulations. That is, it is determined that the host vehicle is incapable of escaping from a high potential field through the lane change at a junction point, a curve, a steep slope, or in a lane-change (or overtaking) prohibited region.

When the vehicle is capable of escaping from a high potential field through the lane change (YES: S508), the computational unit 32 causes the process to proceed to S510. In S510, the computational unit 32 determines control content, according to which a specific vehicle, a target for travel control, changes a lane such that the vehicle escapes from the high potential field. In S508, when it is determined that the vehicle is incapable of escaping from the high potential field through the lane change (NO: S508), the computational unit 32 ends this process.

In subsequent S512, the computational unit 32 branches the process according to whether a specific vehicle, a target for the control content determined in S502, S506, and S510, is capable of being autonomously driven. When the specific vehicle is capable of being autonomously driven (YES: S512), the computational unit 32 causes the process to proceed to S514. In S514, the computational unit 32 prepares control information regarding speed adjustment and steering required to achieve a travel state, which corresponds to the determined control content, through autonomous travel control. After S514, the computational unit 32 ends this process.

In contrast, when it is determined in S512 that the specific vehicle is incapable of being autonomously driven (NO: S512), the computational unit 32 causes the process to proceed to S516. In S516, the computational unit 32 prepares instruction information to instruct a driver to execute travel commands corresponding to the determined control content. After S516, the computational unit 32 ends this process.

The tendency of driving behaviors represented by the learning information recorded in the database 33 may be reflected in determining the control content of the vehicle in S506 or S510. For example, when a driver tends to maintain a relatively short (or long) vehicle-to-vehicle distance, control content is deemed to be determined such that a relatively short (or long) vehicle-to-vehicle distance is taken through the speed adjustment based on learning information regarding the vehicle-to-vehicle distance of a vehicle, which is a target for speed adjustment. The control content regarding lane change is deemed to be determined such that the vehicle is capable of preferentially traveling in a lane in which a driver travels often, based on learning information regarding the position of a lane in which the host vehicle has traveled.

[Description of Vehicle Control Process]

Figure 10:
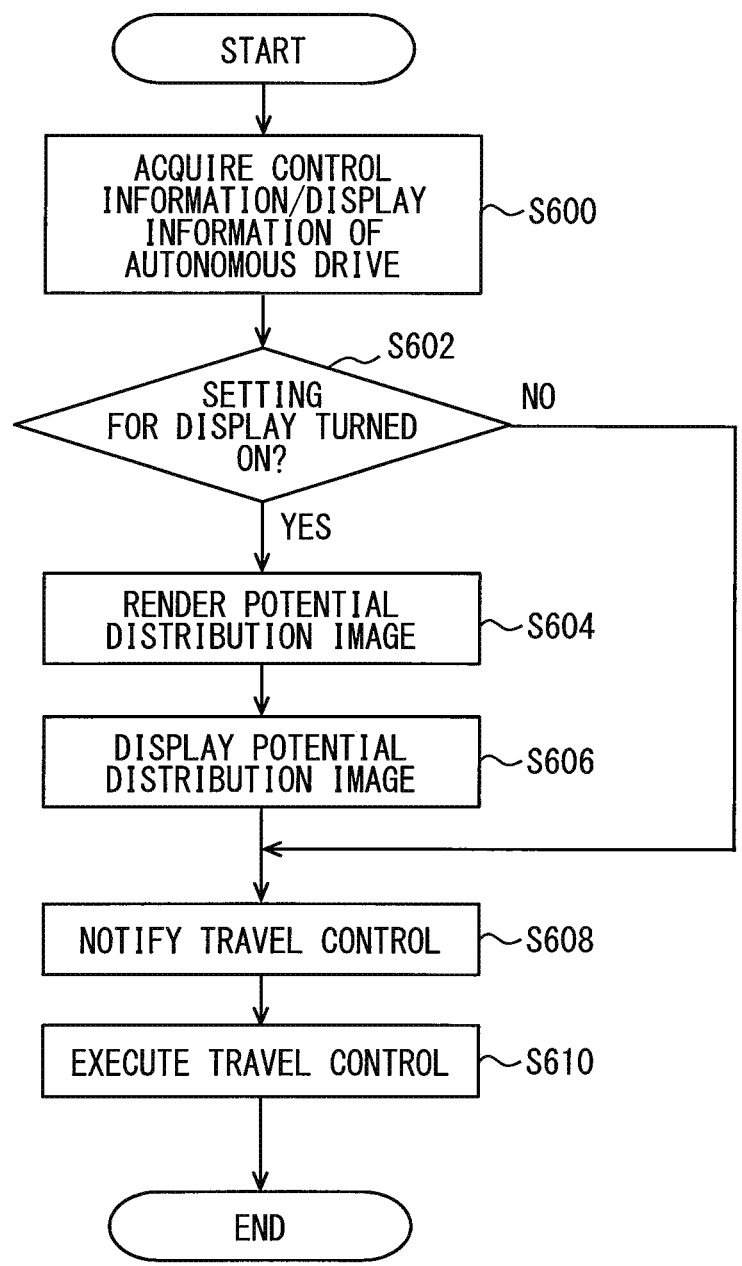
FIG. 10 is a flowchart illustrating the sequence of a vehicle control process.

The sequence of a vehicle control process executed by the control unit 17 of the in-vehicle device 2 will be described with reference to the flowchart illustrated in FIG. 10. This process is repeatedly executed at predetermined control intervals while a vehicle is traveling, with the travel state of the vehicle being controlled by autonomous drive.

In S600, the control unit 17 acquires control information regarding autonomous drive, and image information regarding potential fields from the server 3. These items of information are transmitted in S408 of the main process (refer to FIG. 8) executed by the server 3.

In S602, the control unit 17 branches the process according to whether a setting for displaying an image of visualizing a potential distribution is turned on. In this embodiment, the driver can turn on and off a display via the steering switch of the operation unit 14 at any time. When the setting for displaying a potential distribution image is turned off (NO: S602), the control unit 17 causes the process to proceed to S608. In contrast, when the setting for displaying the potential distribution image is turned on (YES: S602), the control unit 17 causes the process to proceed to S604.

In S604, the control unit 17 renders an image to display the potential distribution on the center display of the display unit 16 according to the image information acquired in S600. A specific example of the visualized potential distribution image is the same as the display example illustrated in FIGS. 5A and 5B in the first embodiment. In subsequent S606, the control unit 17 displays the potential distribution image rendered in S604 on the center display of the display unit 16.

In S608, the control unit 17 notifies the driver of a voice message or the like indicating that a travel state is controlled by autonomous drive. In subsequent S610, the control unit 17 executes travel control through autonomous drive. Specifically, the control unit 17 commands the engine control ECU, the brake control ECU, or the steering angle control ECU of the vehicle control unit 18 to adjust the speed and perform the steering of the vehicle according to the control information acquired in S600. When only a vehicle-to-vehicle distance is controlled through the speed adjustment, the travel control is executed after the driver is notified of the content of the travel control, and when lane change is performed as a part of the travel control, the travel control may be executed after the driver is notified of the content of the travel control, and then driver's consent is acquired. After S610, the control unit 17 ends this process.

[Description of Driver Instruction Process]

The sequence of a driver instruction process executed by the control unit 17 of the in-vehicle device 2 will be described with reference to the flowchart illustrated in FIG. 11. This process is repeatedly executed at predetermined control intervals while a vehicle is traveling, with the travel state of the vehicle not being controlled by autonomous drive.

In S700, the control unit 17 acquires instruction information regarding a driver, and image information regarding potential fields from the server 3. These items of information are transmitted in S408 of the main process (refer to FIG. 8) executed by the server 3.

In S702, the control unit 17 branches the process according to whether a setting for displaying an image of visualizing a potential distribution is turned on. In this embodiment, the driver can turn on and off a display via the steering switch of the operation unit 14 at any time. When the setting for displaying a potential distribution image is turned off (NO: S702), the control unit 17 causes the process to proceed to S708. In contrast, when the setting for displaying the potential distribution image is turned on (YES: S702), the control unit 17 causes the process to proceed to S704.

In S704, the control unit 17 renders an image to display the potential distribution on the center display of the display unit 16 according to the image information acquired in S700. A specific example of the visualized potential distribution image is the same as the display example illustrated in FIGS. 5A and 5B in the first embodiment. In subsequent S706, the control unit 17 displays the potential distribution image rendered in S704 on the center display of the display unit 16.

In S708, the control unit 17 suggests the drive content represented by the instruction information acquired in S600 to the driver through a display on the display unit 16 or voice output. After S708, the control unit 17 ends this process.

EFFECTS

According to the server-managed travel control system in the second embodiment, the following effects are obtained.

The server 3 is capable of collecting information regarding multiple vehicles traveling on a road, and generating the distribution of potential fields of the vehicles. Items of information, which are used to control the travel states of the vehicles in order for the vehicles to travel avoiding high potential fields, are capable of being integrally determined based on the distribution of the generated potential fields. Each vehicle is notified of the control information determined by the server 3, the travel state of each vehicle with the in-vehicle device 2 is controlled based on the notified control information, and thus psychological discomfort given to a driver of each vehicle due to peripheral vehicles is capable of being reduced.

An autonomously driven vehicle is capable of being notified of control information, according to which the travel state of the vehicle is controlled by autonomous drive, and a driver of a non-autonomously driven vehicle can be notified of instruction information. In this manner, the travel states of the vehicles are capable of being integrally controlled in order for the vehicles to travel avoiding high potential fields on a road on which a combination of the autonomously driven vehicles and the non-autonomously driven vehicles are present.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A travel control device comprising:
   a vehicle detection device configured to detect a position of a peripheral vehicle that travels in a periphery of a host vehicle in a lane, in which the host vehicle travels, or a lane, which is adjacent to and is heading in a same direction as the lane in which the host vehicle travels;
   a generation device configured to assign a potential field to a predetermined region, which is adjacent to the position of the peripheral vehicle detected by the vehicle detection device, the potential field indicating a degree of psychological pressure received by a driver of the host vehicle, and configured to generate a potential distribution that represents a distribution of the potential field of the peripheral vehicle on a road;
   a control device configured to control a travel condition of the host vehicle that the host vehicle travels in the potential field, which is relatively low in the potential distribution generated by the generation device;
   a rendering device configured to render a potential distribution image, which virtually illustrates a height of the potential field distributed across the road, based on the potential distribution generated by the generation device; and
   a display control device configured to control a predetermined display device mounted in the host vehicle to display the potential distribution image rendered by the rendering device.

2. The travel control device according to claim 1, further comprising:
   a speed acquisition device configured to acquire speed information indicative of a speed of the host vehicle, wherein:
   the generation device adjusts a range or a height of the potential field that is assigned in a forward and rearward direction of the peripheral vehicle, according to a magnitude of the speed that is represented by the speed information acquired by the speed acquisition device.

3. The travel control device according to claim 1, wherein:
   the vehicle detection device further detects a size of the peripheral vehicle; and
   the generation device adjusts a range or a height of the potential field assigned to the peripheral vehicle, according to the size of the vehicle detected by the vehicle detection device.

4. The travel control device according to claim 1, further comprising:
   a road information acquisition device configured to acquire road information indicative of a road condition, on which the host vehicle travels, wherein:
   the generation device adjusts a range or a height of the potential field assigned to the peripheral vehicle, according to the road condition in the periphery of the host vehicle, the road condition being represented by the road information acquired by the road information acquisition device.

5. The travel control device according to claim 1, further comprising:
   a weather information acquisition device configured to acquire weather information indicative of a weather condition in the periphery of a current location of the host vehicle, wherein:
   the generation device adjusts a range or a height of the potential field assigned to the peripheral vehicle, according to the weather condition which is represented by the weather information acquired by the weather information acquisition device.

6. The travel control device according to claim 1, further comprising:
a road information acquisition device configured to acquire road information indicative of a road condition on which the host vehicle travels, wherein:
the control device restricts a control for a travel condition of the host vehicle when the host vehicle travels on the road having a specific condition, based on the road information acquired by the road information acquisition device.

7. The travel control device according to claim 1, further comprising:
a traffic congestion detection device configured to detect an occurrence of traffic congestion ahead of the host vehicle, wherein:
when the traffic congestion detection device detects the occurrence of traffic congestion ahead of the host vehicle, the control device restricts a control for a travel condition of the host vehicle; and
when the traffic congestion detection device detects that the traffic congestion ahead of the host vehicle is resolved, the control device cancels a restriction.

8. A travel control device comprising:
a vehicle detection device configured to detect a position of a peripheral vehicle that travels in a periphery of a host vehicle in a lane, in which the host vehicle travels, or a lane, which is adjacent to and is heading in a same direction as the lane in which the host vehicle travels;
a generation device configured to assign a potential field to a predetermined region, which is adjacent to the position of the peripheral vehicle detected by the vehicle detection device, the potential field indicating a degree of psychological pressure received by a driver of the host vehicle, and configured to generate a potential distribution that represents a distribution of the potential field of the peripheral vehicle on a road;
a control device configured to control a travel condition of the host vehicle that the host vehicle travels in the potential field, which is relatively low in the potential distribution generated by the generation device;
a recording device configured to acquire driving behavior information regarding a vehicle-to-vehicle distance between the host vehicle and the peripheral vehicle or a lane condition in which the host vehicle has traveled, and configured to store the driving behavior information in a storage device, wherein:
the generation device adjusts a range or a height of the potential field assigned to the peripheral vehicle, according to a tendency of a driving behavior based on the driving behavior information stored in the storage device.

9. A server comprising:
an acquisition device configured to acquire information regarding positions and travel conditions of a plurality of vehicles which travel on a road having a plurality of lanes heading in a same direction;
a generation device configured to assign a potential field to a predetermined region, which is adjacent to a position of each vehicle, based on the information regarding each vehicle acquired by the acquisition device, the potential field indicating a degree of psychological pressure received by a driver of another vehicle, and configured to generate a potential distribution that represents a distribution of the potential field of each vehicle on the road;
a determination device configured to determine control information regarding a travel condition of each vehicle that each vehicle travels in the potential field which is relatively low in the potential distribution generated by the generation device;
a transmission device configured to transmit the control information regarding each vehicle, which is determined by the determination device, to another vehicle corresponding to the control information;
a recording device configured to store driving behavior information, indicative of a driving behavior regarding a vehicle-to-vehicle distance between each vehicle and a peripheral vehicle or a traveled lane condition, in a storage device based on the information acquired by the acquisition device, wherein:
the determination device determines the control information regarding the travel condition of each vehicle according to a tendency of the driving behavior for each vehicle based on the driving behavior information stored in the storage device.

10. The server according to claim 9, wherein:
the determination device determines the control information for controlling a travel condition of an autonomously driven vehicle among the vehicles, and provides an instruction to a driver to adjust the travel condition of a non-autonomously driven vehicle.

11. An in-vehicle device comprising:
a communication device configured to communicate with the server according to claim 9;
a vehicle transmission device configured to transmit information regarding a position and a travel condition of a host vehicle to the server;
a vehicle receiving device configured to receive control information, which is determined by the server, from the server; and
a control device configured to control the host vehicle according to the control information received by the vehicle receiving device.

* * * * *